United States Patent [19]

Armbrüster

[11] Patent Number: 5,418,848
[45] Date of Patent: May 23, 1995

[54] CONTROL LOGIC FOR ECHO CANCELLER WITH DOUBLE TALK DETECTOR

[75] Inventor: Werner Armbrüster, Eckental-Forth, Germany

[73] Assignee: U.S. Philips Corporation, New York, N.Y.

[21] Appl. No.: 898,774

[22] Filed: Jun. 12, 1992

[30] Foreign Application Priority Data

Jun. 18, 1991 [DE] Germany ............... 41 19 963.4

[51] Int. Cl.$^6$ ............................................. H04M 9/08
[52] U.S. Cl. .................................. 379/406; 379/410; 379/411
[58] Field of Search ............ 379/406, 410, 411, 407, 379/408, 409, 345, 388–390

[56] References Cited

U.S. PATENT DOCUMENTS

| | | | |
|---|---|---|---|
| 3,937,907 | 2/1976 | Campanella et al. | 379/406 |
| 4,123,626 | 10/1978 | Munter | 379/406 |
| 4,194,092 | 3/1980 | Luder | 379/407 |
| 4,360,712 | 11/1982 | Horna | 379/406 |
| 4,998,241 | 3/1991 | Brox et al. | 379/406 |
| 5,048,082 | 9/1991 | Krafft | 379/409 |

FOREIGN PATENT DOCUMENTS

| | | | |
|---|---|---|---|
| 0106640 | 10/1983 | European Pat. Off. | H04B 3/20 |
| 0364312 | 4/1990 | European Pat. Off. | 379/411 |

*Primary Examiner*—James L. Dwyer
*Assistant Examiner*—Scott L. Weaver
*Attorney, Agent, or Firm*—Anne E. Barschall

[57] ABSTRACT

The invention relates to an echo canceller (1, 2, 3, 6) including an adaptive filter (3) which can be inserted between a receive path (r) and a send path (s), and including a non-linear filter (2) which can be inserted in the send path (s). The echo canceller is to have an improved echo cancellation, especially when the state of doubletalk occurs, thus substantially avoiding an erroneous activation of the non-linear filter when the state of doubletalk is detected. For this purpose, it is proposed that the echo canceller (1, 2, 3, 6) comprises an up/down counter (11) provided for counting up with a first value ($Z_U$) when the state of doubletalk (d) occurs and for counting down with a second value ($Z_D$) smaller than the first value ($Z_U$) when the states of non-doubletalk (a, b, c) occur, the non-linear filter (2) being provided to be inserted in the send path (s) only when the state of far-end speech (c) occurs and when the up/down counter (11) reaches a predeterminable small value ($Z_N$), especially the zero value.

10 Claims, 1 Drawing Sheet

CONTROL LOGIC FOR ECHO CANCELLER WITH DOUBLE TALK DETECTOR

The invention relates to an echo canceller comprising an adaptive filter which can be inserted between a receive path and a send path, and including a nonlinear filter which can be inserted in the send path.

Echo cancellers of this type are specifically necessary for electric echo cancellation of speech signals for telephone connections via satellite circuits as well as for acoustic echo cancellation for video conference circuits. In these cases the speech signal is additionally delayed as a result of a sophisticated picture encoding. Such delays of the speech signal lead to a line echo in telephone connections via satellite circuits and to an acoustic echo in video conference circuits. However, this is only the case when the far-end speaker is active or when there is doubletalk i.e. when the far-end and the near-end speakers are active. In the state of rest and in the "near-end speaker active" state no echo occurs.

An echo canceller of the type mentioned in the opening paragraph is known from EP 0 106 640 B 1. FIG. 2 in EP 0 106 640 B 1 shows an echo canceller inserted between a send path and a receive path. The echo canceller comprises a filter 100 which forms an echo estimate from the received signal, and a subtractor 45 which subtracts the echo estimate from the send signal. In addition, the send path includes a non-linear filter denoted center clipper downstream of the subtractor, its filter threshold being controllable by the echo estimate.

It is an object of the invention to provide an echo canceller of the type mentioned in the opening paragraph which presents an improvement of the echo cancellation, more specifically, in the case of doubletalk and in which an erroneous activation of the non-linear filter when a state of doubletalk is detected is substantially avoided.

This object is achieved with an echo canceller of the type mentioned in the opening paragraph, in that the echo canceller comprises an up/down counter provided for counting in a first direction with a first value when the state of doubletalk occurs and for counting in a reverse direction to the first direction with a smaller second value relative to the first value when states of non-doubletalk occur, the nonlinear filter being included for insertion in the send path only when the state of far-end speech occurs and when the up/down counter reaches a predeterminable small value.

The invention is based on the recognition that the greatest control problem of the non-linear filter i.e. that of the activation of the non-linear filter or predetermining the threshold value, lies in the recognition of doubletalk. If the received signal and the send signal are only evaluated upstream of, and if the occasion arises also downstream of, a subtractor included in the send path, and if the state of doubletalk is detected on the basis of this, in certain cases, for example when the near-end speaker speaks in a low voice, the state of far-end speech is erroneously detected instead of the state of doubletalk. This erroneously determined state of far-end speech results in that the non-linear filter is activated and thus syllables or complete word portions of the near-end speaker are cut off. This considerably impairs understandability. For avoiding a suchlike erroneous activation of the non-linear filter, the received signal as well as the send signal are first evaluated by an evaluating unit upstream of and downstream of the subtractor and on the basis of this, the four possible states: rest state, far-end speech, near-end speech and doubletalk are detected. Two conditions are to be fulfilled for activating the non-linear filter. One condition is that the state of far-end speech is to have been detected and, in addition, as a second condition, the up/down counter is to have reached the predeterminable value, more specifically, the zero value. The up/down counter then counts up and counts down with values of different magnitudes. The first value for the upcounting is then considerably larger than the second value of the counting down. Counting up with the larger first value of the up/down counter is only performed when the state of doubletalk is detected by the evaluation circuit. With all other detected states of non-doubletalk i.e. with the state of rest, with the states of far-end and near-end speech, the up/down counter counts down with a smaller second value. Not until the two conditions—detected state of far-end speech, and the counter adopting the zero value—have been satisfied, will an activation of the non-linear filter be the result. This avoids an erroneous activation of the non-linear filter in the event of an erroneously detected state of far-end speech instead of the state of doubletalk. Especially in the cases where the near-end speaker speaks in a low voice, a considerable improvement of the understandability is then made possible.

The two conditions for activating the up/down counter are satisfied in a simple manner, in that the countup input of the up/down counter is coupled to the output featuring the state of doubletalk and the countdown input is coupled to the outputs of the evaluation circuit featuring the states of non-doubletalk, the output of the evaluation circuit featuring the state of far-end speech being combined with the output of the up/down counter by means of an AND gate.

The countdown input of the up/down counter is activated in a simple manner, in that the outputs of the evaluation circuit are combined by means of an OR gate for the states of non-doubletalk, the output of the OR gate being connected to the countdown input of the up/down counter.

In an embodiment of the invention the maximum value of the up/down counter can, more specifically, be adaptively predetermined in response to the attenuation of the adaptive filter. For example, if the attenuation of the adaptive filter is small, a large value is selected for the maximum value of the up/down counter. An increasing attenuation of the echo filter reduces this maximum value. This embodiment is based on the recognition that the state of doubletalk is recognized better and thus erroneous decisions occur more rarely according as the attenuation of the adaptive filter is larger.

Possible embodiments for the non-linear filter are provided in that the non-linear filter is provided for suppressing its input signal when the value of the predeterminable threshold is fallen short of, and for reducing the input signal when the value of the threshold is exceeded by the threshold value, or for switching the input signal through when the value of the threshold is exceeded.

The invention will be further explained with reference to the exemplary embodiments shown in the drawing Figures, in which.

Figure 1:
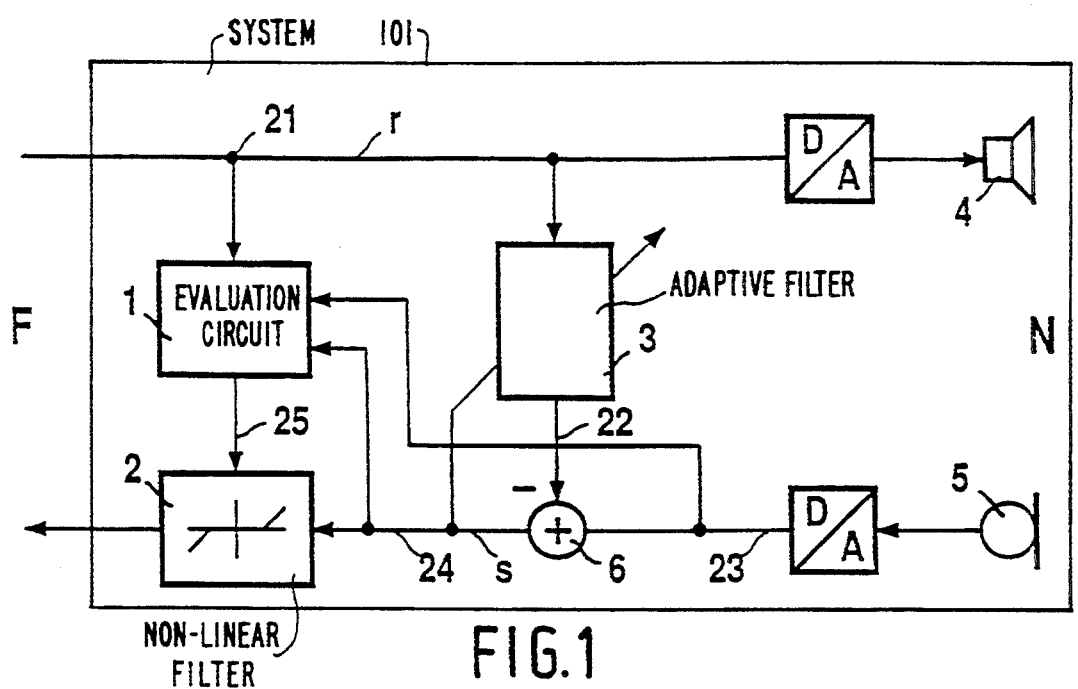
FIG. 1 shows an exemplary embodiment of an echo canceller.

FIG. 1 shows an echo canceller as it can be employed, for example, for a video conference circuit or satellite transmission system 101. The echo canceller 1, 2, 3, 6 is included between a send path s and a receive path r. Speech signals sent from a far end F are digitally transmitted over the receive path r. They are applied to a digital-to-analog converter D/A whose analog output is connected to a loudspeaker 4 of a near end N. At the near end N also a microphone 5 is arranged. The input signals of the microphone 5 are applied to an analog-to-digital converter A/D, whose digital output is connected to the send path s. The echo canceller 1, 2, 3, 6 comprises an adaptive filter 3, a subtractor 6, an evaluation circuit 1 as well as a non-linear filter 2. The adaptive filter 3 is supplied with the digital signal transmitted over the receive path r, the adaptive filter 3 producing an echo estimate 22 from the received signal. The echo estimate 22 produced by the adaptive filter is subtracted from the send signal by means of the subtractor 6. Furthermore, the non-linear filter 2 denoted center clipper is included in the send path s downstream of the subtractor 6, the center clipper output signal being transmitted to the far end F of the video conference circuit. The evaluation circuit 1 evaluates the received signal 21 sent over the receive path, r as well as the send signals 23 upstream of and 24 downstream of the subtractor and controls the non-linear filter 2. At the far end F an echo canceller similar to the one in accordance with the exemplary embodiment represented in FIG. 1 is advantageously provided.

In the following the operation in principle of the echo canceller 1, 2, 3, 6 represented in FIG. 1 is further described. The echo canceller comprises the adaptive filter 3, which is a component already known and is supplied with the received signal 21. The adaptive filter 3 forms an echo estimate 22. The adaptive filter 3 electrically imitates the transmission properties between loudspeaker 4 and microphone 5 i.e. the acoustic impulse response of the room and produces the synthetic echo signal 22 i.e. the echo estimate 22. This echo signal 22 is subtracted from the digitized send signal of the microphone 5 and thus cancels substantially the echo of the room by means of addition in phase opposition. The coefficients of the adaptive filter 3 are to be modifiable i.e. the filter 3 is to be adaptive, because the impulse response of the room strongly depends on the properties of the room as well as the positioning of the loudspeaker 4 and microphone 5. For example, the so-termed NLMS algorithm (Normalized Least Mean Square) is used for adjusting the coefficients. The power of the adaptive filter 3, however, is limited. The residual echo of the signal 24 is suppressed by means of the non-linear filter 2 (center clipper). A possible characteristic line of the non-linear filter 2 is represented inside the block 2. This clarifies that the input signal 24 of the nonlinear filter 2 is suppressed when a predeterminable threshold is fallen short of and, when this threshold is exceeded, is reduced by the value of the threshold. Termed differently: if the input signal 24 of the non-linear filter 2 is smaller than its threshold, the output signal will be equal to zero. If the input signal exceeds the threshold, the output of the non-linear filter 2 will present a distorted signal, which can be considered a linear superpositioning of the input signal 24 with a noise signal. The threshold of the non-linear filter 2 may be selected to be adaptive. If the threshold adopts the value of zero, the non-linear filter 2 will become short-circuited, if the threshold is selected to be very large, the non-linear filter 2 will become an open switch. The non-linear filter 2 is controlled by means of an evaluation circuit 1. The latter determines four states on the basis of the received signal 21 and the send signals 23 upstream of and 24 downstream of the subtractor 6, as will be described in more detail with reference to FIG. 2. In the rest state there is neither far-end nor near-end speech. The non-linear filter 2 remains inactive during this state. In the state of far-end speech the non-linear filter 2 is to be active and thus suppress the remaining residual echo of the signal 24. In the state of near-end speech as well as in the state of doubletalk the non-linear filter is to be inactive i.e. the threshold of the non-linear filter 2 is to adopt the zero value. The greatest problem for activating the non-linear filter 2 is the recognition of doubletalk. The decision whether far-end speech or doubletalk occurs is generally made by means of a level comparison of the signals 21 and 23 for which, as required, also the signal 24 may be used. Especially in the case where the near-end speaker speaks in a low voice, however, the decision may erroneously be made that it is a matter of far-end speech instead of doubletalk. In prior-art systems the non-linear filter 2 will then erroneously be activated and, as a result, syllables or whole word portions of the near-end speaker may be cut off. This considerably impairs understandability.

For avoiding such impairments, the evaluation circuit 1 comprises a counter in addition to an evaluation circuit for detecting the states, the minimum value of which counter being zero and the maximum value being an upper limit. The counter is incremented by a first value once doubletalk has been recognized and decremented by a second value once doubletalk has not been recognized. The first value by which the counter is incremented is clearly larger than the second value by which the counter is decremented. The non-linear filter 2 is activated by the counter included in the logic circuit 1, so that the non-linear filter will not be activated until the counter reaches the value of zero. Consequently, erroneous decisions, especially during the doubletalk state, are bridged and the non-linear filter 2 cannot be activated erroneously. The maximum value of the counter is also adaptive and depends on the attenuation of the adaptive filter 3. The larger the attenuation of the adaptive filter 3 the better the detection of doubletalk will be and the more rarely will the erroneous decisions occur. If the attenuation of the adaptive filter is small, the maximum value of the counter is selected to be large. With an increasing attenuation of the adaptive filter 3 the maximum value of the counter is reduced.

Figure 2:
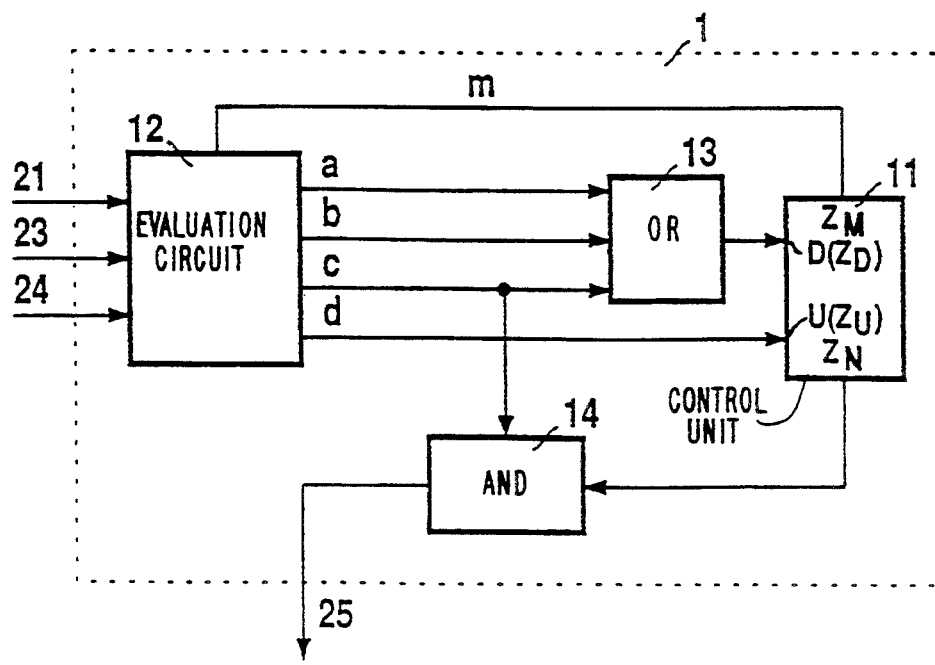
FIG. 2 shows an exemplary embodiment of an evaluation circuit for an echo canceller.

FIG. 2 shows an exemplary embodiment for an evaluation circuit 1 included in the echo canceller shown in FIG. 1. The evaluation circuit 1, hereinafter also referenced logic circuit, comprises an evaluation circuit 12, an OR gate 13, an up/down counter 11 as well as an AND gate 14. The evaluation circuit 12 is supplied with the signals 21, 23, 24 which were already supplied in conjunction with FIG. 1. The evaluation circuit 12 makes a decision on the state and detects the states of rest a, near-end speech b, far-end speech c as well as doubletalk d on the basis of the signals 21, 23, 24. The evaluation circuit 12 has an additional output m for defining the maximum of the up/down counter 11. The outputs for the states of rest a, near-end speech b, as well as far-end speech c produce the input signals of the OR gate 13. The output of the OR gate 13 is connected to the countdown input D of the up/down counter 11. The countup input U of the counter 11 is activated by the detected state of doubletalk d. The output of the up/down counter 11 is connected to a first input of the AND gate 14, a second input of the AND gate 14 being activated by the detected state of far-end speech c. The output of the AND gate 14 produces the control signal 25 (FIG. 1) for activating the non-linear filter (center clipper) 2.

The essential operation of the logic circuit 1 is as follows: a counter 11 is incremented by a first value $Z_U$ when doubletalk d is recognized, and decremented by a second value $Z_D$ when doubletalk is not recognized i.e. when the states of rest a, nearend speech b and far-end speech c are recognized. The first value $Z_U$ is distinctly larger than the second value $Z_D$. The logic circuit 1 represented in FIG. 2 causes the nonlinear filter 2 represented in FIG. 1 not to become active i.e. a signal 25 not to be present, until the evaluation circuit has adopted the state of far-end speech c and the up/down counter 11 has adopted the zero value. In this manner erroneous decisions of the non-linear filter, especially during the state of doubletalk d, are bridged and an erroneous activation of the non-linear filter 2 (FIG. 1 ) is avoided. This provides an essential improvement of understandability.

The evaluation circuit 12 also defines the maximum $Z_M$ of the counter 11. This maximum $Z_M$ depends on the attenuation of the adaptive filter 3 (FIG. 1). The larger the attenuation of the adaptive filter, the better the detection will be of the doubletalk state d and the more rarely will the erroneous decisions occur. If the attenuation of the adaptive filter is small, a large value is chosen for the maximum $Z_M$ of the counter 11. With increasing attenuation of the adaptive filter the maximum $Z_M$ is reduced.

The echo canceller described in the exemplary embodiment can, in addition to being applied to a video conference circuit, also be employed in further applications for which echo cancellation is necessary. For example, such an echo canceller is also suitable for cancelling echoes of speech signals for satellite circuit telephone connections. In that case the microphone 5 as well as the loudspeaker 4 represented in FIG. 1 are to be replaced by a hybrid circuit of a telephone receiver comprising a mouth-piece and an ear-piece.

Instead of an up/down counter, the echo canceller may also comprise a control unit controlling the switching on of a non-linear filter. The non-linear filter will then not be activated until the two following conditions are satisfied, i.e. the first condition is that the state of far-end speech is detected and the second condition is that the control unit determines a control value which corresponds to a predeterminable value or a value range respectively. The control value is then, for example, the difference between the number of doubletalk states weighted with a first weight factor, and the number of detected states of non-doubletalk, which number is weighted with a smaller second weight factor than the first weight factor. The control unit may also comprise a counter which determines the number of detected states of doubletalk and non-doubletalk with a predeterminable timing. The basic structure of the block diagram represented in FIG. 2 is then maintained. The control unit 11 is only inserted instead of the up/down counter.

The control unit 11 may also be arranged as a filter having a fast rising or a slowly falling impulse response. Such a filter 11 is also controlled in response to the detected state of doubletalk and the states of non-doubletalk. The detected state of doubletalk controls the rising characteristic line of the impulse response of the filter 11, whereas the non-doubletalk states control the slowly falling characteristic line of the filter 11. The non-linear filter 14 in the exemplary embodiment shown in FIG. 2 will not be activated until both the first condition i.e. detected state of far-end speech and the second condition i.e. the output value of the filter 11 reaches a predeterminable value $Z_N$, are satisfied.

I claim:

1. An echo canceller for use with a circuit, the circuit extending from a near end to a far end including a send path and a receive path, the echo canceller comprising:
   an adaptive filter (3) disposed between the receive path (r) and the send path (s) ;
   a activatable non-linear filter (2) in the send path (s),
   an evaluation circuit (12) coupled to the receive path and the send path for detecting states of double talk (d) and non double talk (a,b,c) and far end speech (c); and
   an up/down counter (11) connected to the evaluation circuit (12) for counting in a first direction with a first value ($Z_U$) when the state of doubletalk (d) occurs and for counting in a reverse direction with a smaller second value ($Z_D$) relative to the first value ($Z_U$) when the states of non doubletalk (a,b,c) occur, the non-linear filter (2) being activated only when the state of far end speech (c) occurs and when the up/down counter (11) reaches a predeterminable small value ($Z_N$), whereby echo cancellation errors resulting from activation of the non-linear filter (2) in the state of doubletalk (d) are reduced.

2. An echo canceller as claimed in claim 1, in which the evaluation circuit (12), in addition to detecting the states of doubletalk (d) and far-end speech (c), also detects the states of rest (a) and near-end speech (b) , and
   the non-linear filter (2) is activated when the state of far-end speech (c) is detected and inactivated when the states of near-end speech (b), double talk (d) and rest (a) are detected.

3. An echo canceller as claimed in claim 2
   in which a countup input (U) of the up/down counter (11) is coupled to an output of the evaluation circuit (12) indicating the state of doubletalk (d) and a countdown input (D) of the up/down counter (11) is coupled to outputs of the evaluation circuit (12) indicating the states of non-double talk (a,b,c) and
   further comprising an AND gate (14) for combining an output of the evaluation circuit (12) indicating the state of far-end speech (c) with an output ($Z_N$) of the up/down counter (ii).

4. An echo canceller as claimed in claim 2 further comprising
   an OR gate (13) for combining outputs of the evaluation circuit (12), which outputs correspond to the states of non-doubletalk (a,b,c), an output of the OR gate (13) being connected to a countdown input (D) of the up/down counter (11).

5. An echo canceller as claimed in claim 1, in which a maximum value ($Z_M$) of the up/down counter (11) is determined adaptively in response to attenuation of the adaptive filter (3).

6. An echo canceller as claimed in claim 5, wherein the maximum value ($Z_M$) of the counter (11) decreases with increasing attenuation of the adaptive filter (3) and increases with decreasing attenuation of the adaptive filter (3).

7. Echo canceller as claimed in claim 1, characterized in that the non-linear filter (2) is provided for
a)
   i) suppressing an input signal (24) to the non-linear filter when the input signal (24) is less than a predetermined threshold value, and
   ii) reducing the input signal (24) by the predetermined threshold value, when the input signal (24) exceeds the predetermined threshold value, or
b) switching the input signal (24) through when the input signal (24) exceeds the predetermined threshold value.

8. Video conference system or satellite transmission system comprising an echo canceller as claimed in claim 1.

9. Echo canceller (1, 2, 3, 6) comprising
an activatable adaptive filter (3) disposed between a receive path (r) and a send path (s),
an activatable non-linear filter (2) in the send path (s) for cancellation of a state of doubletalk (d),
an evaluation circuit for detecting the state of doubletalk (d) and states of non-doubletalk (a, b, c),
a control unit (11) for determining a control value based on which state is detected from amongst the states of doubletalk (d) and non-doubletalk (a, b, c), and for controlling activation of the non-linear filter (2); the control value changing with a first velocity in a first direction in the state of doubletalk (d) and changing with a second velocity lower than the first velocity in a second direction, opposite to the first direction, in the states of non-doubletalk (a,b,c); the non-linear filter (2) being activated only when a state of far end speech (c) occurs and when the control value reaches a predeterminable value range ($Z_N$), whereby echo cancellation errors resulting from activation of the non-linear filter (2) in the state of doubletalk are reduced.

10. Echo canceller as claimed in claim 9, characterized in that the control unit (11) is a counter or a filter.

* * * * *